2,693,408

HERBICIDAL COMPOSITIONS

John J. D'Amico, Charleston, W. Va., assignor to Monsanto Chemical Company, St. Louis, Mo., a corporation of Delaware No Drawing. Application December 8, 1952,
Serial No. 324,844

18 Claims. (Cl. 71—2.5)

This invention relates to a method of destroying vegetation and to herbicidal compositions. More particularly it relates to herbicidal compositions containing as an essential active ingredient a 2-mercaptothiazolyl chloro olefin. These agents are effective against a wide variety of plants including broad leaf plants and grasses. A particular object of the invention is to provide herbicidal compositions which are effective defoliants. Another object is to provide compositions for the destruction of noxious vegetation.

Since the foliage often interferes with the proper functioning of mechanical harvesters, it is important to have effective defoliating agents available. In accordance with this invention it has been discovered that foliage is destroyed by contact with 2- mercaptothiazolyl chloro olefins. These toxicants may be conveniently applied in the form of spray containing concentrations of the active ingredient in the range of 0.1% to 10.0%. Uniform application to the foliage of such crop plants as cotton, beans and corn effects rapid destruction of the foliage. The leaves either dry or drop off or both. Furthermore, the herbicidal compositions of this invention are also useful for the destruction of weeds such as wild aster, wild snapdragon, sour grass, golden rod, Queen Anne's lace, Canadian thistle, dandelion, dock, Johnson grass, wild onion, pepper weed, smut grass, carpet grass, plantain, bindweed, lamb's-quarter, foxtail, shepherd's purse, chickweed, pigweed, nettles, wild mustard, wild radish, wild morning glory, purslane and wild carrot.

For the preparation of herbicidal compositions the mercaptothiazolyl chloro olefin may be dissolved in a suitable solvent, as for example a mineral oil fraction, and the solution emulsified in water. Preferably mineral oil fractions having herbicidal properties are used. In general these comprise mineral oil fractions high in aromatic constituents. Other examples are light paraffin base oil, fuel oil, diesel oil and bunker C fuel oil. Although the mercaptothiazolyl chloro olefins are insoluble in water, they are soluble in most organic solvents. They are usually soluble in acetone, chloroform, ethyl alcohol, ethyl acetate, benzene, ether and heptane. 1-(2-benzothiazolylmercapto)-trans-2,3-dichloro-2-butene, however, is insoluble in cold ethyl acetate. This compound is a light yellow solid, M. P. 43° C., whereas most members of the class are liquids. The solution of the mercapto-thiazolyl chloro olefin is emulsified in aqueous medium by the aid of a dispersing agent or dispersed directly in water. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil as well as other dispersing and wetting agents. The herbicidal activity of the compounds is illustrated by application to the foliage of bean and corn plants. The mercaptothiazolyl chloro olefin was emulsified in water and applied to the foliage at the concentration shown in the table below and the effect on the plants recorded. It will be noted that the compounds possess strong herbicidal activity of a type which renders them very effective for use as defoliants.

Table

| Active Ingredient | Conc., percent | Bean | Corn |
|---|---|---|---|
| 1-(2-Benzothiazolyl-mercapto)-3-chloro-2-butene | 0.3 | leaves dried and dropped | severe damage. |
|  | 1.0 | plants dead, leaves dried and dropped | plants dead, leaves dried. |
| 3-(2-Benzothiazolyl-mercapto)-2-chloro-1-propene | 0.3 | severe damage | severe damage. |
|  | 1.0 | plants dead, leaves dried | plants dead, leaves dried. |
| 1-(2-Benzothiazolyl-mercapto)-trans-2,3-dichloro-2-butene | 0.3 | moderate injury | severe injury. |
|  | 1.0 | leaves dried | leaves dried. |
| 3-(2-Benzothiazolyl-mercapto)-1-chloro-1-propene | 0.3 | plants dead, leaves dried | plants dead, leaves dried. |
| 3-(Mixed ethyl and dimethyl-2-thiazolyl-mercapto)-2-chloro-1-propene | 0.3 | moderate injury | Do. |
|  | 1.0 | plants dead, leaves dried | Do. |
| 4-(Mixed ethyl and dimethyl-2-thiazolyl-mercapto)-2-chloro-2-butene | 0.3 | severe injury | Do. |
|  | 1.0 | plants dead, leaves dried and dropped | Do. |
| 3-(4-Methyl-2-thiazolyl-mercapto)-2-chloro-1-propene | 1.0 | no injury | moderate injury. |
| 4-(4-Methyl-2-thiazolyl-mercapto)-2-chloro-2-butene | 1.0 | slight injury | plants dead. |
| 3-(5-Carbethoxy-4-methyl-2-thiazolylmercapto)-2-chloro-1-propene | 1.0 | severe injury | plants dead, leaves dried. |
| 3-(5-Carbomethoxy-4-methyl-2-thiazolylmercapto)-2-chloro-1-propene | 1.0 | severe injury, leaves dried | severe injury, leaves dried. |
| 4-(5-Carbobutoxy-4-methyl-2-thiazolylmercapto)-2-chloro-2-butene | 1.0 | moderate injury | moderate injury. |
| 2-(3-Chloro-2-butenyl)-2-mercapto-4-methyl-5-thiazolylmethyl ketone | 1.0 | severe injury, leaves dried | plants dead, leaves dried. |
| 2-(2-Chloroallylmercapto)-4-methyl-5-thiazolyl-methyl ketone | 1.0 | do | Do. |

As illustrative of the use on cotton, a spray composition containing 0.3% of 1-(2-benzothiazolylmercapto)-3-chloro-2-butene was applied to the foliage of a plot of cotton plants. This resulted in drying and dropping of the leaves. A further example of an effective cotton defoliant is 1-(2 - benzothiazolylmercapto)- 4 - chloro-2-butene.

Herbicidal activity was also demonstrated by application of the mercaptothiazolyl chloro olefin to the ground before any plants emerged. For example application at the rate of 50 pounds per acre of 3-(2-benzothiazolylmercapto)-2-chloro-1-propene or 3-(2-benzothiazolylmercapto)-1-chloro-1-propene resulted in severe injury to rye grass and beets when the plants emerged. However, the effectiveness is greater when applied directly to foliage and this mode of application is preferred. As indicated mixtures of the active ingredient may be employed. A further example of a suitable mixture is the reaction product obtained by condensing mixed propene chlorides and sodium mercaptobenzothiazole. Other mercaptothiazolyl chloro olefins than those specifically mentioned above, as for example 2-(3-chloro-2,4-hexadienylmercapto)benzothiazole, may be used for destroying vegetation.

The invention is further illustrated by applying to foliage a phytotoxic amount of a compound of the structure

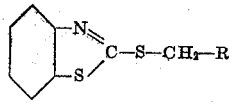

where R is a chloro substituted 1-alkenyl group containing less than five carbon atoms or a compound of the structure

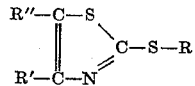

where R represents a chloro substituted lower alkenyl group, R′ represents a lower alkyl group and R″ represents hydrogen, lower alkyl, lower carbalkoxy or lower acyl groups.

The methods for preparing the mercaptothiazolyl chloro olefins are disclosed in co-pending applications Serial Nos. 265,211 filed January 5, 1952; 294,930, filed June 21, 1952, and 316,095, filed October 21, 1952, of which the present application is a continuation-in-part.

It is intended to cover all changes and modifications of the examples of the invention herein chosen for purposes of disclosure which do not constitute departures from the spirit and scope of the invention.

What is claimed is:

1. The method of destroying vegetation which comprises applying to the foliage thereof a phytotoxic amount of a composition comprising as the essential active ingredient a 2-mercaptothiazolyl chloro olefin having at least one mercaptothiazolyl group and at least one chloro substituent attached to an open chain lower unsaturated hydrocarbon containing at least one double bond.

2. The method of destroying vegetation which comprises applying to the foliage thereof a phytotoxic amount of a composition comprising as the essential active ingredient a compound of the structure

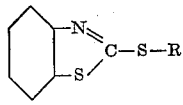

where R is an unsaturated chloro substituted lower alkenyl group.

3. The method of destroying vegetation which comprises applying to the foliage thereof a phytotoxic amount of a composition comprising as the essential active ingredient a compound of the structure

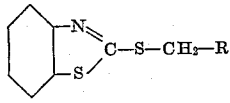

where R is a chloro substituted 1-alkenyl group containing less than five carbon atoms.

4. The method of destroying vegetation which comprises applying to the foliage thereof a phytotoxic amount of a composition comprising as the essential active ingredient a compound of the structure

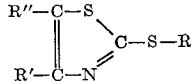

where R" is a member of a group consisting of hydrogen, lower alkyl, lower carbalkoxy and lower acyl groups, R' represents lower alkyl and R represents a chloro substituted lower alkenyl group.

5. The method of destroying vegetation which comprises applying to the foliage thereof a phytotoxic amount of a composition comprising as the essential active ingredient 1-(2-benzothiazolylmercapto)-3-chloro-2-butene.

6. The method of destroying vegetation which comprises applying to the foliage thereof a phytotoxic amount of a composition comprising as the essential active ingredient 3-(2-benzothiazolylmercapto)-2-chloro-1-propene.

7. The method of destroying vegetation which comprises applying to the foliage thereof a phytotoxic amount of a composition comprising as the essential active ingredient 3-(2-benzothiazolylmercapto)-1-chloro-1-propene.

8. The method of destroying vegetation which comprises applying to the foliage thereof a phytotoxic amount of a composition comprising as the essential active ingredient 3-(mixed ethyl and dimethyl-2-thiazolylmercapto)-2-chloro-1-propene.

9. The method of destroying vegetation which comprises applying to the foliage thereof a phytotoxic amount of a composition comprising as the essential active ingredient 4-(mixed ethyl and dimethyl-2-thiazolylmercapto)-2-chloro-2-butene.

10. A herbicidal composition comprising a major proportion of a carrier and as the essential active ingredient a phytotoxic concentration of a 2-mercaptothiazolyl chloro olefin having at least one mercaptothiazolyl group and at least one chloro substituent attached to an open chain lower unsaturated hydrocarbon containing at least one double bond.

11. A herbicidal composition comprising a major proportion of a carrier and as the essential active ingredient a phytotoxic concentration of a compound of the structure

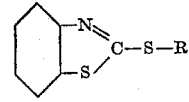

where R is an unsaturated chloro substituted lower alkenyl group.

12. A herbicidal composition comprising a major proportion of a carrier and as the essential active ingredient a phytotoxic concentration of a compound of the structure

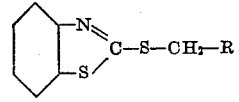

where R is a chloro substituted 1-alkenyl group containing less than five carbon atoms.

13. A herbicidal composition comprising a major proportion of a carrier and as the essential active ingredient a phytotoxic concentration of a compound of the structure

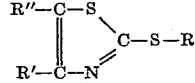

where R" is a member of a group consisting of hydrogen, lower alkyl, lower carbalkoxy and lower acyl groups, R' represents lower alkyl and R represents a chloro substituted lower alkenyl group.

14. A herbicidal composition comprising a major proportion of a carrier and as the essential active ingredient a phytotoxic concentration of 1-(2-benzothiazolylmercapto)-3-chloro-2-butene.

15. A herbicidal composition comprising a major proportion of a carrier and as the essential active ingredient 3-(2-benzothiazolylmercapto)-2-chloro-1-propene.

16. A herbicidal composition comprising a major proportion of a carrier and as the essential active ingredient a phytotoxic concentration of 3-(2-benzothiazolylmercapto)-1-chloro-1-propene.

17. A herbicidal composition comprising a major proportion of a carrier and as the essential active ingredient a phytotoxic concentration of 3-(mixed ethyl and dimethyl-2-thiazolylmercapto)-2-chloro-1-propene.

18. A herbicidal composition comprising a major proportion of a carrier and as the essential active ingredient a phytotoxic concentration of 4-(mixed ethyl and dimethyl-2-thiazolylmercapto)-2-chloro-2-butene.

References Cited in the file of this patent

UNITED STATES PATENTS

| Number | Name | Date |
| --- | --- | --- |
| 2,637,646 | Kosmin | May 5, 1953 |
| 2,637,647 | Kosmin | May 5, 1953 |